United States Patent [19]

Saito

[11] Patent Number: 5,038,222
[45] Date of Patent: Aug. 6, 1991

[54] IMAGE PROCESSING APPARATUS HAVING DISPLAY MEANS
[75] Inventor: Yoshihiro Saito, Tokyo, Japan
[73] Assignee: Canon Kabushiki Kaisha, Tokyo, Japan
[21] Appl. No.: 417,053
[22] Filed: Oct. 4, 1989
[30] Foreign Application Priority Data Oct. 7, 1988 [JP] Japan .................................. 63-254247

[51] Int. Cl.$^5$ ............................................. H04M 1/00
[52] U.S. Cl. .................................. 358/401; 358/496; 358/498
[58] Field of Search ............... 358/401, 402, 403, 496, 358/23, 75, 498, 254; 355/23, 55

[56] References Cited

U.S. PATENT DOCUMENTS

| 4,475,128 | 10/1984 | Koumura | 358/496 |
| 4,652,932 | 3/1987 | Miyajima | 358/254 |
| 4,656,524 | 4/1987 | Norris | 358/401 |
| 4,691,237 | 9/1987 | Shimizu | 358/409 |
| 4,908,719 | 3/1990 | Nonoyama | 358/496 |

Primary Examiner—Edward L. Coles, Sr.
Attorney, Agent, or Firm—Fitzpatrick, Cella, Harper & Scinto

[57] ABSTRACT

An image processing apparatus having a display means includes an original inlet for feeding in an original, an original outlet for discharging the original, and feeding structure for feeding the original from said original inlet to said original outlet through a predetermined feeding path. The feeding path includes an upwardly-inclined portion between the original inlet and the original outlet. Reading circuitry is disposed along the feeding path for reading an image from the original being fed in order to output an image signal corresponding to the read image. A display is disposed above the original inlet and has a display surface substantially parallel to the upwardly-inclined portion of the feeding path, for displaying the read image thereon based on the image signal outputted from the reading circuitry. A recording section may be provided for recording the image signal outputted from the reading circuitry onto a recording medium. Preferably, the display is vertically-disposed with the original inlet being below the display and the original outlet being above the display.

31 Claims, 9 Drawing Sheets

| FIG. 5A | FIG. 5B |

FIG. 9
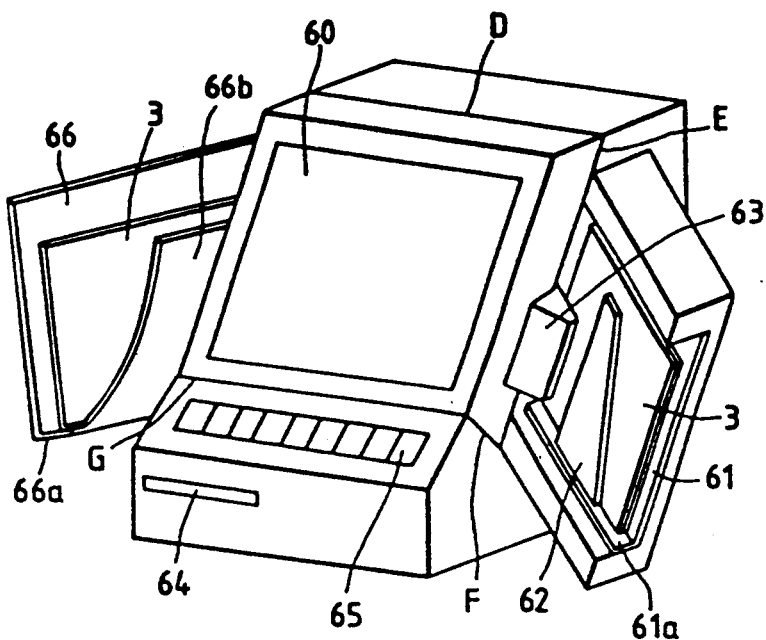
FIG. 10A
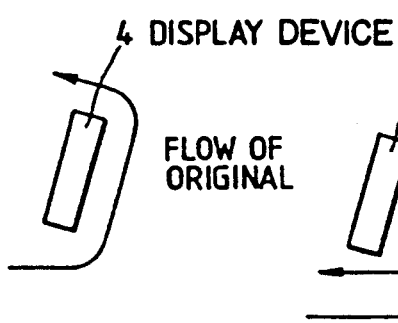
FIG. 10C
FIG. 10B
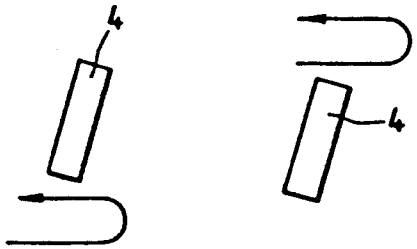

ject of the present invention is to provide a small-sized image processing apparatus having a simple construction.

IMAGE PROCESSING APPARATUS HAVING DISPLAY MEANS

BACKGROUND OF THE INVENTION

1. Field of the Invention

The present invention relates to an image processing apparatus optically reads an original image, displays the read image, and records the read image on a recording medium.

2. Related Background Art

In the past, an electronic filing system has been known as one apparatus of this kind. As shown in FIG. 11, the is conventional electronic filing system comprises an image reading apparatus for reading an original image, a recording apparatus for recording the read image, a display apparatus for displaying the read image or the recorded image, a printer apparatus for printing such an image on a recording paper, and an operation board for controlling these apparatuses.

However, in the above-mentioned conventional system, since the apparatuses are independently arranged, for example, when the original image is inputted by the image reading apparatus, it could not be confirmed or ascertained whether the image is being read correctly or not, during the reading operation. Therefore, since it must be ascertained whether the image was correctly read after the reading of the image is completed, if the images included in a number of originals should be inputted, there arises a problem that the capacity of the memory must be increased accordingly. Further, since an operator must turn around between the reading apparatus and the display everytime, he will feel uncomfortable during the operation. In addition, the system requires a large installation space, and, accordingly, the installation site of the system is limited.

SUMMARY OF THE INVENTION

An object of the present invention is to eliminate the above-mentioned conventional drawbacks.

Another object of the present invention is to provide a small-sized image processing apparatus having a simple construction.

A further object of the present invention is to provide an image processing apparatus which can efficiently use the space in the apparatus by arranging an original feeding path around an image display portion, thereby reducing the installation space of the apparatus.

Another other object of the present invention is to provide an image processing apparatus which makes an image processing operation easier by integrally arranging an image display means, original feeding path, image reading means, and image recording means.

BRIEF DESCRIPTION OF THE DRAWINGS

FIG. 9 is a perspective view of an image processing apparatus according to another embodiment of the present invention;

FIGS. 10A, 10B and 10C comprise explanatory view for explaining the relation between a display means and a movement of an original;

DETAILED DESCRIPTION OF THE PREFERRED EMBODIMENTS

The present invention will now be explained in connection with embodiments thereof with reference to the accompanying drawings.

Figure 1:
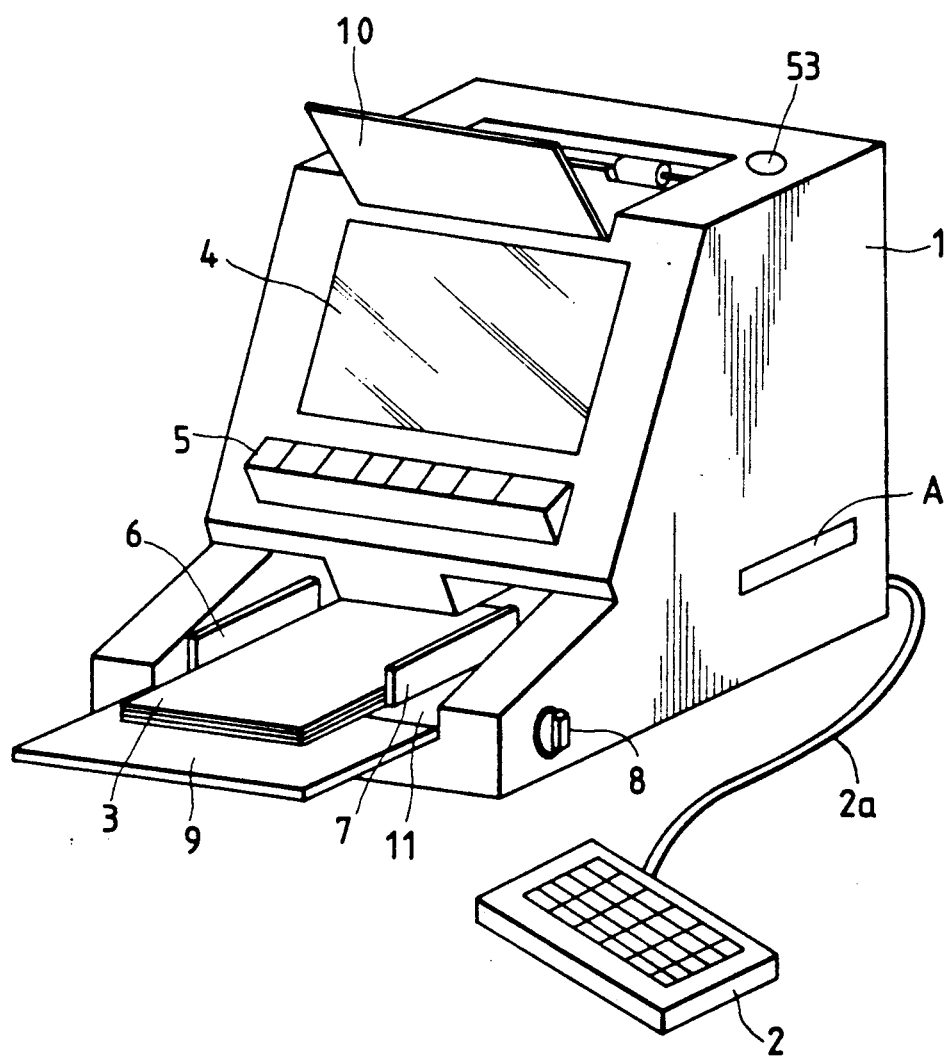
FIG. 1 is a perspective view of an image processing apparatus according to a preferred embodiment of the present invention.
Figure 2:
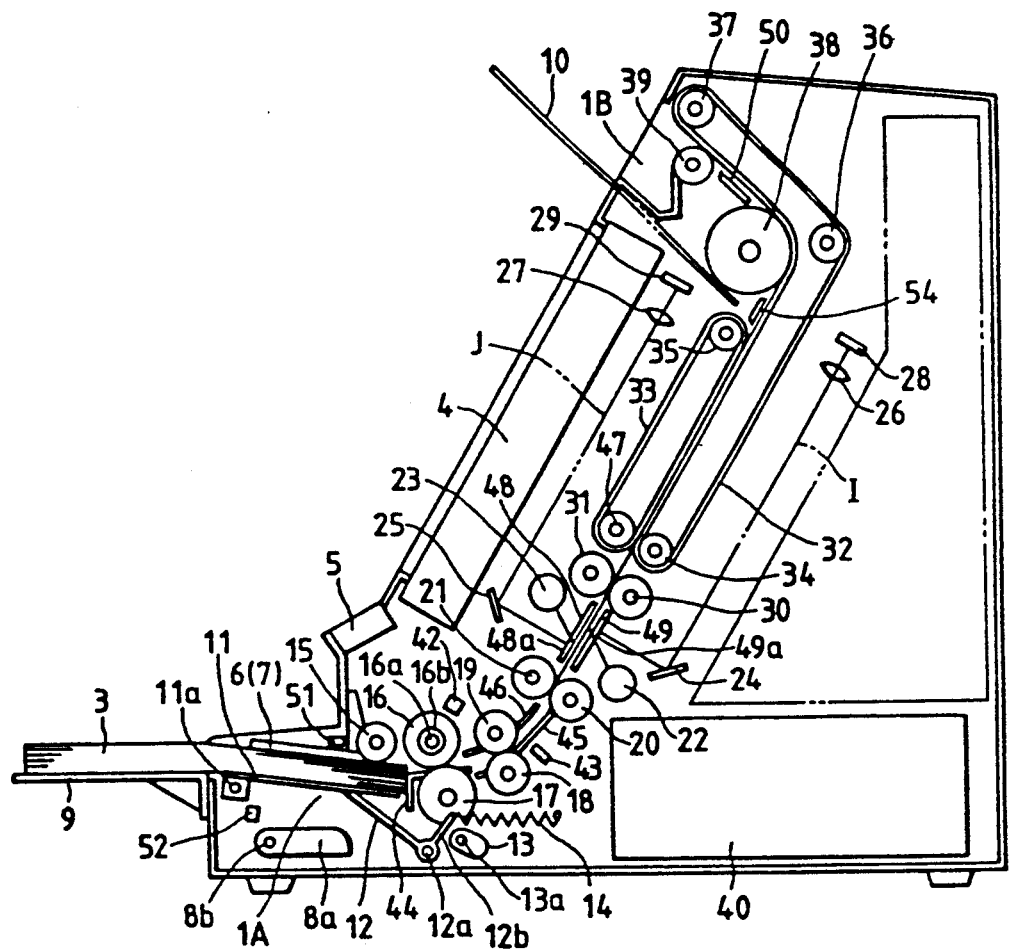
FIG. 2 is a side sectional view of the apparatus of FIG. 1.

In FIGS. 1 and 2 showing a perspective view and a sectional view of an image processing apparatus according to a preferred embodiment of the present invention, respectively, the reference numeral 1 designates an image processing apparatus, and 2 designates an operation board connected to the body of the image processing apparatus. The reference numeral 3 designates sheet-shaped originals, and 4 designates a display apparatus arranged in front of the body of the image processing apparatus 1, which display apparatus 4 may comprise a plate-shaped display using a liquid crystal, electro-luminescence, plasma, or fluorescence display tube.

The image processing apparatus 1 includes operation switches 5, side plates 6, 7 mounted on an original support 11 for movement in a direction perpendicular to an original feeding direction to regulate a lateral position of each original 3, and a change-over knob 8 for changing over between an automatic mode wherein a plurality of originals are automatically fed and a manual mode wherein the originals are manually fed one by one. The knob 8 is fixed to a rotatable shaft 8b to which a lever 8a is attached. The reference numeral 9 designates a tray for supporting the originals 3, which tray is removably mounted on the body of the image processing apparatus 1. The reference numeral 10 designates an ejector tray extractably mounted on the body of the apparatus 1, which ejector tray can be retracted in a position shown by a two-dot chain line when it is not used.

The above-mentioned original support 11 is mounted on the body of the apparatus for rotation around a pivot 11a. The reference numeral 12 designates an L-shaped lever for lifting up the original support 11, which lever 12 has a leg abutted against the original support 11 and another leg 12b connected to one end of a spring 14, the other end of which is fixed to the body of the apparatus. Accordingly, the L-shaped lever 12 is biased to rotate in a clockwise direction around a pivot 12a, thereby lifting up the original support 11 in a counterclockwise direction. The reference numeral 13 designates a rotatable cam eccentrically fixed to a cam shaft 13a, which cam abuts against the leg 12b of the L-shaped lever 12 to rotate the lever in a counterclockwise direction in opposition to the bias force of the spring 14. The cam shaft 13a of the cam 13 is connected to a driving portion through an appropriate drive connection means such as a clutch.

An original inlet 1A for introducing the original into a feeding path formed in the body of the image processing apparatus 1 is provided in the vicinity of a lower end of the display apparatus 4, and an original outlet 1B for ejecting the original from the feeding path and out of the apparatus is provided in the vicinity of an upper end of the display apparatus 4. The original feeding path is defined between the original inlet 1A and the original outlet 1B.

The reference numeral 15 designates an original feed roller for feeding the original stored in the tray 9 to the predetermined feeding path, which roller can rotate in a counterclockwise (FIG. 2) direction. A pair of rollers 16, 17 serve to separate and feed the original. The roller 16 is a feed roller rotated in a counterclockwise direction, and the roller 17 is a counter roller also rotated in a counterclockwise direction. The feed roller 16 is rotatably mounted on a shaft 16a through a one-way clutch 16b so that the roller 16 can be rotated in a counterclockwise direction. The shaft 16a can transmit a driving force to the original feed roller 15 through a gear train, and is connected to the driving portion through an appropriate drive connection means such as a clutch. In this way, the timing of the operation of the original fed roller 15 and the feed roller 16 is controlled by the one-way clutch.

The counter roller 17 is drivingly connected to a feeding roller 18 through a gear train and the like, thus being driven. The reference numeral 19 designates a driven pressure roller pressed against the feeding roller 18. The feeding roller 18 is connected to the driving portion through an appropriate drive connection means such as a clutch. The pressure roller 19 is rotatably mounted on an upper guide plate 46 which is in turn rotatably supported by the shaft 16a. The upper guide 46 defines the original feeding path together with lower guide plates 44 and 45.

The reference numeral 42 designates a sensor for detecting the rotation of the feed roller 16, and 43 designates a sensor for detecting the original 3.

The reference numerals 20 and 30 designate feeding rollers which cooperate with driven pressure rollers 21 and 31 pressed against the feeding rollers 20 and 30, respectively. The feeding roller 20 is operatively connected to the feeding roller 18 through a gear train to be driven in synchronism with the feeding roller 18. Accordingly, the timing of operation of the feeding rollers 18, 20 is controlled by the clutch provided between the feeding roller 18 and the driving portion.

The reference numerals 48 and 49 designate guide plates. The guide plate 48 has a longitudinal elongated transparent window 48a through which the image on an upper surface of the original is read, and the guide plate 49 has a longitudinal elongated transparent window 49a through which the image on a lower surface of the original is read. Incidentally, these windows 48a, 49a may comprise slit openings. Further, as shown in FIG. 2, the windows 48a and 49a are offset from each other in the longitudinal direction.

A light source 22 which may comprise a fluorescent lamp emits line-shaped (elongated) light which illuminates the lower surface of the original through the transparent window 49a. Similarly, a light source 23 which also may comprise a fluorescent lamp emits line-shaped light which illuminates the upper surface of the original through the transparent window 48a. Incidentally, the reference numerals 24 and 25 designate plane mirrors; 26 and 27 designate focusing lenses; and 28 and 29 designate linear image sensors such as CCD's.

The reference numeral 37 designates a drive roller for driving a feeding belt 32; 34 designates a roller for supporting the other end of the feeding belt 32; and 36 designates a tension roller for applying a tension force to the feeding belt 32. Similarly, the reference numeral 35 designates a drive roller for driving a feeding belt 33, and 47 designates a tension roller for applying a tension force to the feeding belt 33. The reference numeral 38 designates an idle roller; 39 designates an ejector roller; and 50 and 54 designate guide plates. The image processing apparatus 1 further includes a recording apparatus 40 for recording the original image on a recording medium such as an optical disc and the like, and an insertion opening A (FIG. 1) for inserting and removing the recording medium with respect to the image processing apparatus.

As shown in FIG. 2, the original feeding path extending between the original inlet 1A and the original outlet 1B is positioned behind (or back of) the display apparatus 4 substantially in parallel with the display surface of the display apparatus.

Next, the operation of the mechanisms of the image processing apparatus will be explained.

Figure 3:
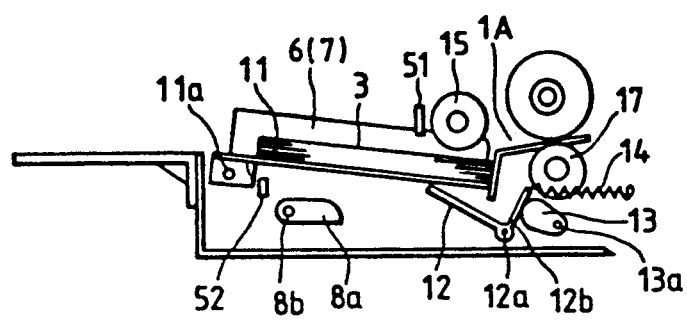
FIGS. 3 and 4 are schematic sectional views showing an original feeding portion.

First of all, when a plurality of originals are automatically fed, as shown in FIG. 3, the L-shaped lever 12 is lowered by the cam 13, whereby the original support 11 is brought to a lowermost position. In this condition, the originals 3 are supplied onto the original support 11. Then, when a switch provided on the operation board 2 or an operation switch 5 is pushed, a motor (not shown) provided in the image processing apparatus is driven.

Consequently, the cam shaft 13a is rotated by half revolution through the clutch (not shown) provided between the cam shaft 13a and the driving portion, thus rotating the cam 13 to a position shown in FIG. 2. In this condition, the clutch is deactivated to disconnect the cam shaft 13a from the driving portion. Consequently, the L-shaped lever 12 is rotated in a clockwise direction by the spring 14, thus lifting the original support 11 to abut the upper surface of the uppermost original 3 against the original feed roller 15.

Then, the feed roller 16 and the original feed roller 15 are rotated in counterclockwise directions, respectively, by the activation of the clutch provided between the roller shaft 16a and the driving portion. Incidentally, the clutch (not shown) provided between the feeding roller 18 and the driving portion is activated to operatively connect the roller 18 to the driving portion, at the same time when the above-mentioned motor is driven. Therefore, the feeding roller 18, and the counter roller 17 and the feeding roller 20 connected to the feeding roller 18 through gear trains, respectively, are in the driving condition. Further, the feeding roller 30 and belt drive rollers 37, 35 connected to the motor through the drive transmission means such as the gear train or timing belt are also in the driving condition.

By means of the original feed roller 15, the originals 3 are fed to the separating station, where only the uppermost original is separated from the other originals by the feed roller 16 and the counter roller 17. The separated original is then fed to the nip between the feeding roller 18 and the pressure roller 19.

When a leading edge of the original reaches the original detecting sensor 43, the clutch (not shown) provided between the roller shaft 16a and the driving portion is deactivated, with the result that the original 3 is fed to the nip between the feeding roller 20 and the pressure roller 21 only by a feeding force provided by the feeding roller 18 and the pressure roller 19. At the same time, the original feed roller 15 and the feed roller 16 are freely rotated by the movement of the original 3 engaged therewith and being fed by the rollers 18, 19. At the time when a trailing edge of the original has passed through the original feed roller 15, this roller 15 and the roller shaft 16a are stopped.

Although the feed roller 16 is rotated by the movement of the original until the latter has passed through the former, because of the action of the one-way clutch provided between the feed roller 16 and the roller shaft 16a, the roller shaft 16a can be maintained in a stopped condition, and, thus, the original feed roller 15 connected to the feed roller 16 is also maintained in a stopped condition. When the feed roller 16 is stopped as the trailing edge of the original 3 has passed through the feed roller 16, the stoppage of the roller 16 is detected by the roller rotation detecting sensor 42, after a predetermined time is elapsed the clutch is activated again to drive the original feed roller 15 and the feed roller 16 for feeding the next original.

On the other hand, the original 3 fed by the feeding roller 20 and the pressure roller 21 is introduced between the guide plates 48 and 49, where the upper and lower surfaces of the original are illuminated by the line-shaped light emitting light sources 23 and 22 through the transparent windows 48a and 49a, respectively. The light images obtained by illuminating the original by means of the light sources 22, 23 are reflected by the plane mirrors 24 and 25 to advance along optical paths I and J substantially parallel to the feeding path, and then are introduced into the focusing lenses 26 and 27 to be focused on the image sensors 28 and 29, respectively.

Then, the original images are converted by the image sensors 28, 29 to electric signals. As mentioned above, the transparent windows 48a and 49a formed in the guide plates 48, 49 are slightly offset from each other in the longitudinal direction (i.e., the original feeding direction). Accordingly, an area of the first or lower surface of the original illuminated by the light source 22 is not overlapped with an area of the second or upper surface of the original illuminated by the light source 23, thereby preventing the image on the opposite surface from being transmitted through the original in case of a thin original.

After the images on the original are read through the transparent windows 48a, 49a, the original is pinched and fed by the feeding roller 30 and the pressure roller 31, and by the feeding belt 32, 33 and then is ejected.

In this way, the original is fed. After all of the originals set on the original support 11 have been fed, the absence of an original is detected by the sensor 51, with the result that the clutch (not shown) provided between the cam shaft 13a and the driving portion is activated. Consequently, the cam 13 is rotated by half a revolution, thus lowering or pushing down the L-shaped lever 12 in opposition to the spring 14, whereby the original support 11 is brought into its lowermost position as shown in FIG. 3. The clutch is deactivated when the cam 13 is rotated by half a revolution. Further, after a predetermined time is elapsed (for completing the ejection of the original) from when the trailing edge of the last original is detected by the original detection sensor 43, the motor (not shown) is stopped.

Figures 5, 5A:
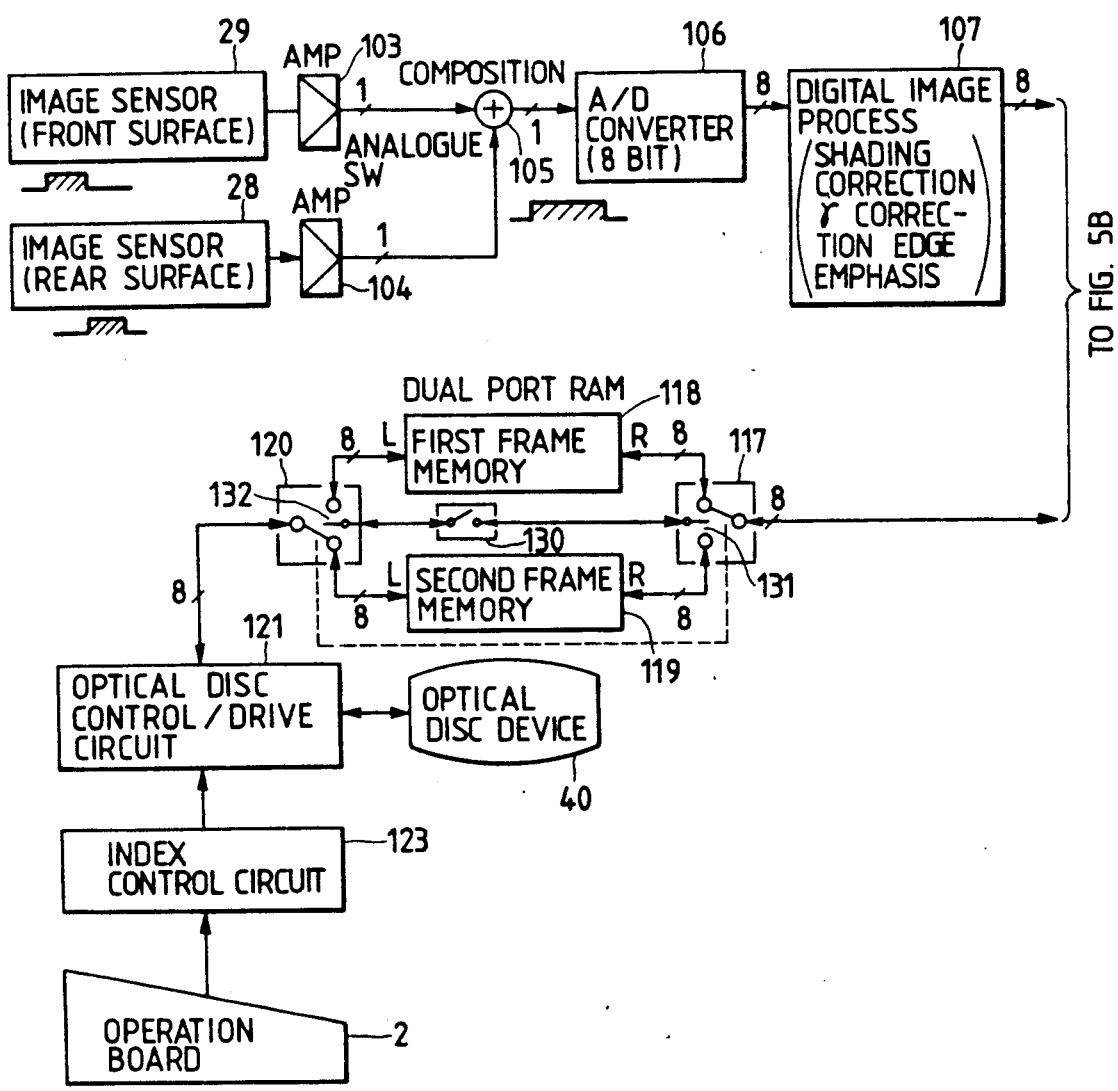
FIG. 5, 5A-5B are block diagrams showing flow of image signals.
Figure 5B:
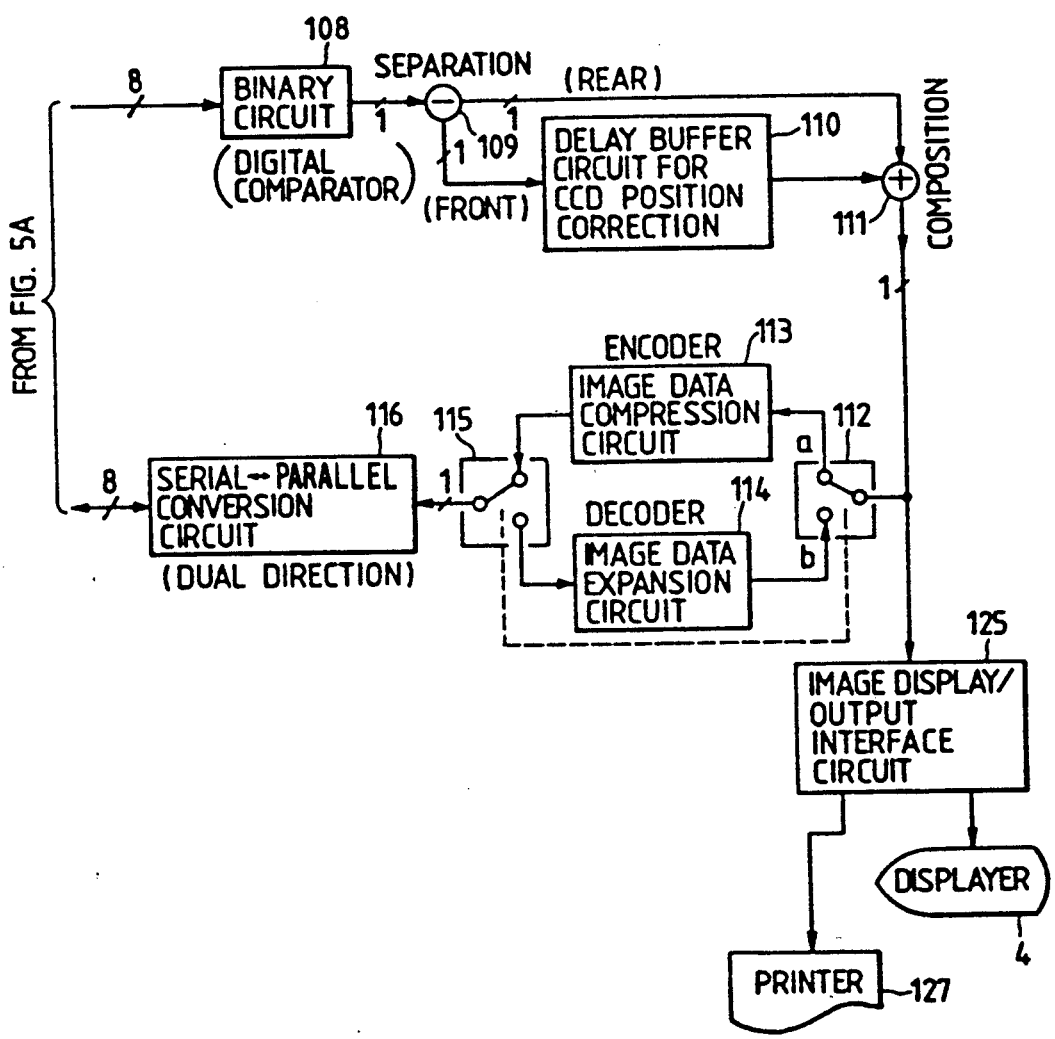

FIG. 5 is a block diagram showing the flow of the image signals after being converted to electric signals by the image sensors such as CCD's.

In FIG. 5, the image signals converted to electric signals by the image sensors 28, 29 are sent to respective amplifiers 104, 103, where outputs of pixel arrays of the image signals are amplified to predetermined levels. Then, the image signal of the upper or front surface of the original (from the image sensor 29) and the image signal of the lower or rear surface of the original (from the image sensor 28) are changed over by an analog switch 15 alternately, line by line, to form or compose a single line, of a composed image signal.

Figure 6:
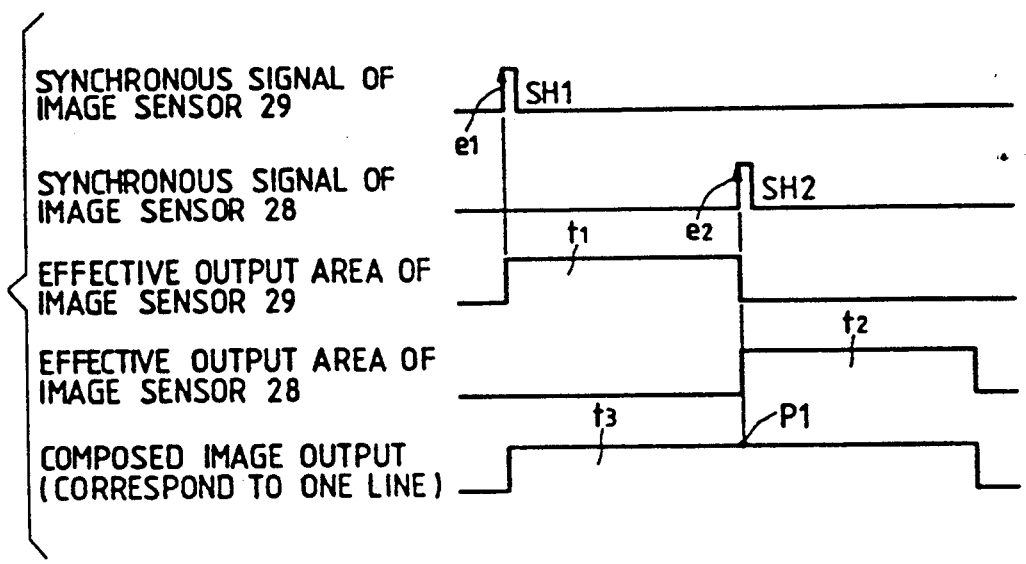
FIG. 6 is a timing chart showing timings of the operations of image sensors.

The timing of the operation of these image sensors 28, 29 is shown in FIG. 6. In FIG. 6, the symbol SH1 designates a synchronous signal for the initiation of the output of the pixel array from the image sensor 29; from a leading edge e1 of this signal SH1, the output of the pixel array from the image sensor 29 is initiated, and the effective signal is outputted through the duration t1. On the other hand, a synchronous signal for the image sensor 28 is emitted immediately before the duration is elapsed; from a leading edge e2 of this signal SH2, the output of the pixel array from the image sensor 28 is initiated, and the effective signal is outputted through the duration t2. The symbol t3 designates a composed image output duration where a single composed image signal (corresponding to one line) is generated by changing over both effective signals in the vicinity of a changing point P1 between the above-mentioned effective duration t1 of the image sensor 29 and the effective duration t2 of the image sensor 28. In this way, by changing over the signals to provide the single input, the subsequent image processing can be performed by a single system.

Figure 7:
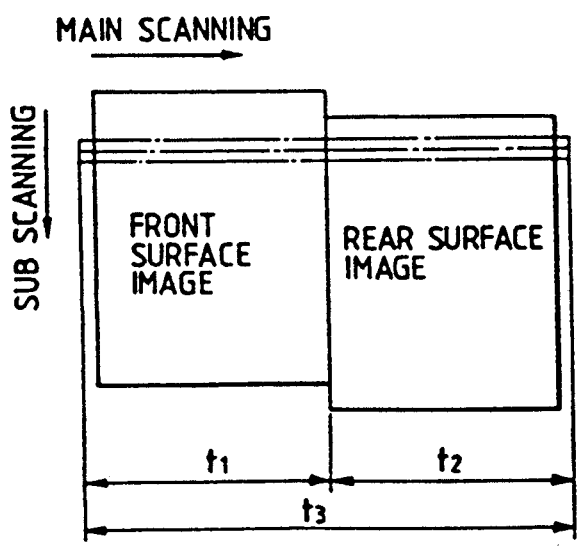
FIG. 7 is an explanatory view showing the correspondence between a composed image signal and an actual image.

FIG. 7 shows the relation between the composed image signal having the above-mentioned time duration t3 and the actual images on the front and rear surfaces of the original. As shown in FIG. 7, the image on the front surface of the original corresponds to the time duration t1, and the image on the rear surface of the original corresponds to the time duration t2, and the time duration is obtained by adding the duration t1 to the duration t2.

Next, the line of the composed image signal so obtained is converted to 8 bit digital signal arrays by an A/D (analog/digital) converter 106 (FIG. 5). Then, the signal is processed by a digital image process circuit 107 to effect necessary image quality improving processes such as shading correction, $\gamma$-correction, edge emphasis or the like. Then, the signal is converted to a binary signal of white and black level by means of a binary circuit 108 comprising a digital comparator.

Next, the binary image signal is separated again by a separation circuit (or digital signal change-over circuit) 109 into a signal for the front surface of the original and a signal for the rear surface of the original. Since the signal has already been changed to the binary condition, such separation of the signal by the separation circuit 109 can easily be realized by using the synchronous signals SH1 and SH2 of the image sensors 29, 28 as timing signals.

The front surface signal separated by the separation circuit 109 is sent to a delay buffer circuit 110 for CCD position correction using memory elements of a FIFO construction, where the front surface signal is adjusted to have a timed relation with the rear surface signal, thereby amending the deviation due to the offset between the image sensors. Then, the front and rear surface signals are composed again by a composition circuit (or digital signal change-over circuit) 111 to obtain a single image signal (corresponding to one line).

The composed image signal again composed by the composition circuit 111 is sent to the display apparatus or displayer 4 through an image display/ output interface circuit 125, thus displaying the image corresponding to the comprised signal in real time. In this way, the original image actually being read can be monitored in real time. The composed image signal again composed by the composition circuit 111 is also sent to a digital signal change-over switch 112 which is electrically connected to an upper contact a when the read image is inputted. The signal is then sent to an image data compression circuit 113, where the image signal, i.e., image data is compressed.

Next, the image data compressed by the image data compression circuit 113 is inputted, through a digital signal change-over switch 115 operated in synchronism with the digital signal change-over switch 111, to a serial-parallel conversion circuit 116, where the image data is converted to a parallel signal having an 8 bit width.

The 8 bit compressed image signal converted by the serial-parallel conversion circuit 116 is written in either a first or a second frame memory 118 or 119 comprising a dual port RAM selected by a digital signal change-over switch 117, from that side (R side). After the data corresponding to one original is written on either frame memory in this way, the digital signal change-over switch 117 is changed over to be connected to the other frame memory for preparing the write-in of the data of the next original to said the other frame memory.

While the data is being written on the frame memory selected by the digital signal change-over switch 117, a digital signal change-over switch 120 provided at the opposite (L) side of that frame memory is connected to the other frame memory, from which the data is read out by an optical disc control/drive circuit 121, and then, the read-out data is recorded in the optical disc apparatus 40.

Further, at the same time, index information previously stored in an index control circuit 123 by the operator's manipulation through the operation board 2 is transferred to the optical disc control/drive circuit 121, by which the index information can be stored in the optical disc apparatus 40 together with the image data, by adding the index information to the image data read out from the above-mentioned frame memory for discriminating the stored data, or by additionally providing a directory area for recording the index information.

When the whole data stored in the read-out frame memory, i.e., the above-mentioned other frame memory is recorded on or transferred to the optical disc apparatus 40, the digital signal change-over switch 120 is changed over to be connected to the opposite frame memory (opposite to the other frame memory) for preparing the recording of the image data of the next original. In this condition, the other frame memory is waiting for the read in of the image data corresponding to the next original. In this way, by alternately using two frame memories 118, 119 for each image data corresponding to one original, the image data of the originals 3 continuously fed into the frame memories can be recorded on the optical disc apparatus 40.

Incidentally, in FIG. 5, the reference numeral 114 designates an image data expansion circuit. Since the image data recorded on the optical disc apparatus is in the compressed condition, when the image data is picked up from the optical disc apparatus and then is outputted to the displayer 4 or a printer 127, the compressed image data is restored to the normal condition by the image data expansion circuit 114.

Figure 12:
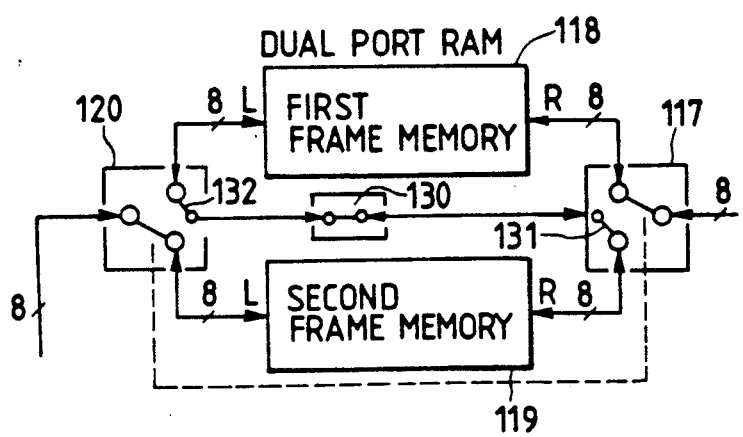
FIG. 12 is an auxiliary explanatory view showing the flow of an image signal.

Now, although there is no problem when the frame memories have adequate capacities for the original image signals, in most cases, each frame memory is normally set to have a capacity smaller than the number of essential pixels in anticipation of the compression ratio by means of the image data compression circuit 113. In this case, it is possible that the capacity of the compressed image data will exceed the set capacities of the frame memories 118, 119. Under such circumstances, for example, if the capacity of the frame memory 118 is anticipated to be overflowed, immediately before the overflow of the capacity of the frame memory occurs, a switch 130 is turned to a closed condition, and at the same time, switches 131, 132 of the memory selection switch 117, 120 are connected to each other, as shown in FIG. 12. As a result, the frame memory 118 is connected to the frame memory 119 in series, thus obtaining a combined frame memory having a capacity twice than that of each frame memory 118, 119, whereby the image data can be stored in the combined frame memory without losing the original image data.

Here, since the speed of the read-in of the data to the optical disc apparatus is selected to be faster than the write-in of the data to the frame memory, at the time when the frame memory 119 is connected to the frame memory 118 in series, the read-in of the data to the optical disc has already been completed. Accordingly, there is no danger that the write-in of the data to the frame memory 119 is effected simultaneously with the read-out of the data from that frame memory 119.

On the other hand, after the frame memory 118 is connected to the frame memory 119 in series, when the original image has been read by the image sensors, the clutch provided between the feeding roller 20 and the driving portion, and the clutch provided between the roller shaft 16a and the driving portion are deactivated, thus stopping the next fed original at the upstream side of the reading area of the image sensors. At the same time, the image data read in the frame memories 118, 119 beginning to be written in the optical disc apparatus 40. Meanwhile, the original, the image of which has already read, is ejected onto the tray 10 by the feeding roller 30 and the feeding belts 32, 33.

When the read-in of the data to the optical disc apparatus 40 is completed, the switch 125 and the memory selection switches 117, 120 are returned to the respective conditions shown in FIG. 5. At this point, the clutch provided between the feeding roller 20 and the driving portion and the clutch provided between the roller shaft 16a and the driving portion are activated again, thus feeding the next original to the reading area of the image sensors.

As mentioned above, since, if the image data is more than the set capacity of each frame memory, two frame memories can be connected to each other in series and the next original can be stopped at the upstream side of the reading area of the image sensors, it is possible to prevent the problem wherein the image data overflows from the memory and the next image data is sent to the frame memory before the previous image data has been completely processed.

In the above, an example was provided wherein the clutches for controlling the operation of the rollers are provided between the feeding roller 18 and the driving portion and between the roller shaft 16a and the driving portion and wherein when the original image data overflows the set memory capacity these clutches are simultaneously controlled. However, by connecting a driving part of the clutch provided between the roller shaft 16a and the driving portion to the feeding roller 18, only the clutch provided between the feeding roller 18 and the driving portion may be controlled. Also in this case, as similar to the above, the drive controls of the feeding rollers 18, 20, feed roller 16, counter roller 17 and original feed roller 15 can be simultaneously performed.

Figure 4:
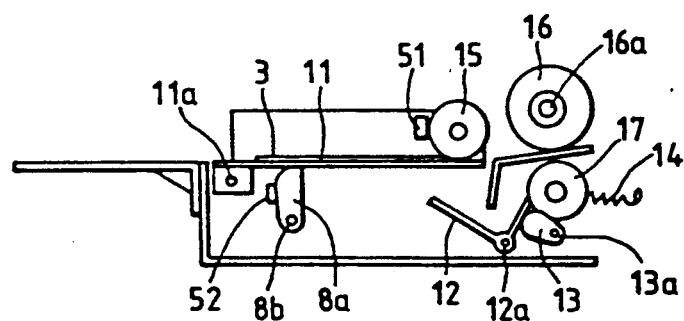

When it is desired for the originals to be fed manually one by one, the knob 8 is rotated in an counterclockwise direction. Consequently, the lever 8a is rotated, thus lifting the original support 11 from the lowermost position to a horizontal position as shown in FIG. 4 and supporting the original support 11 at that horizontal position (by means of the lever 8a). In this position, the original support 11 is abutted against the original feed roller 15. On the other hand, the counter roller 17 connected to the lever 8a is lowered to a position where the counter roller is positioned below the upper surface of the guide plate 44.

Then, the original is manually inserted into the nip between the original feed roller 15 and the original support 11 with the aid of the latter acting as a guide. Then, when a switch 5 or a switch on the operation board 2 is depressed, the motor (not shown) starts to rotate. At the same time, by activating the clutch, the original feed roller 15 is rotated to introduce the original into the apparatus 1. Then, the original is fed to the reading area of the image sensors by means of the feed roller 16 and the feeding rollers 18, 20, as mentioned above, and can be ejected by means of the feeding roller 30 and the feeding belts 32, 33.

The change-over to the manual mode can be effected by detecting the position of the lever 8a by means of an manual mode detection sensor 52. Incidentally, in the above, while the manual mode (the energization of the motor) was initiated by depressing the switch 5 or a switch on a operation board 2, the manual mode may be started when the original detection sensor 51 detects the fact that the original is inserted into the nip between the original feed roller 15 and the original support 11.

Since the counter roller 17 is lowered out of the feeding path in response to the movement of the knob 8 for the manual mode, it is possible to feed even flexible original or rigid and thick original, thereby enlarging the available kinds of originals which can be fed.

Figure 8:
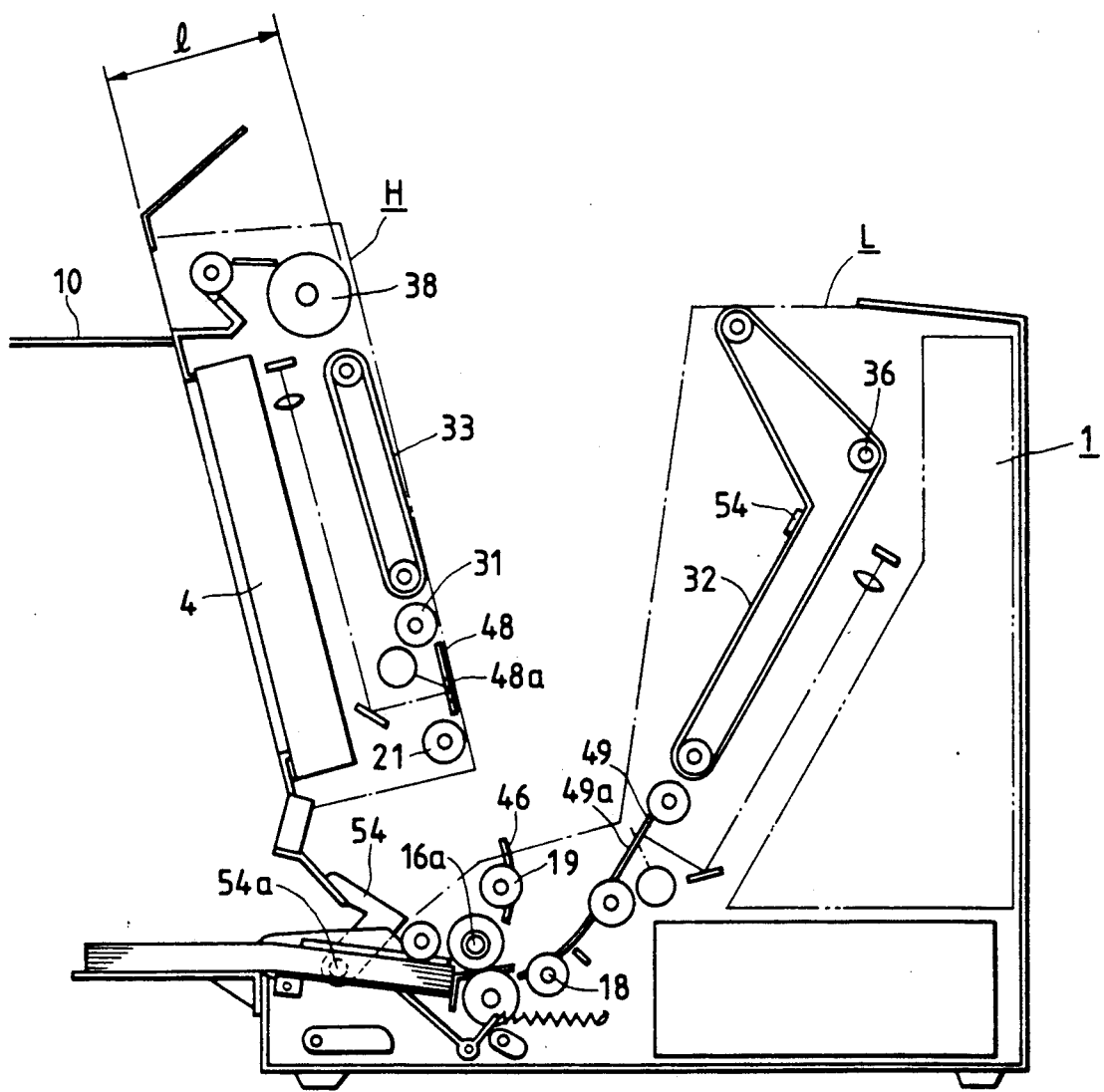
FIG. 8 is a schematic sectional view of the apparatus in an open condition.
Figure 11:
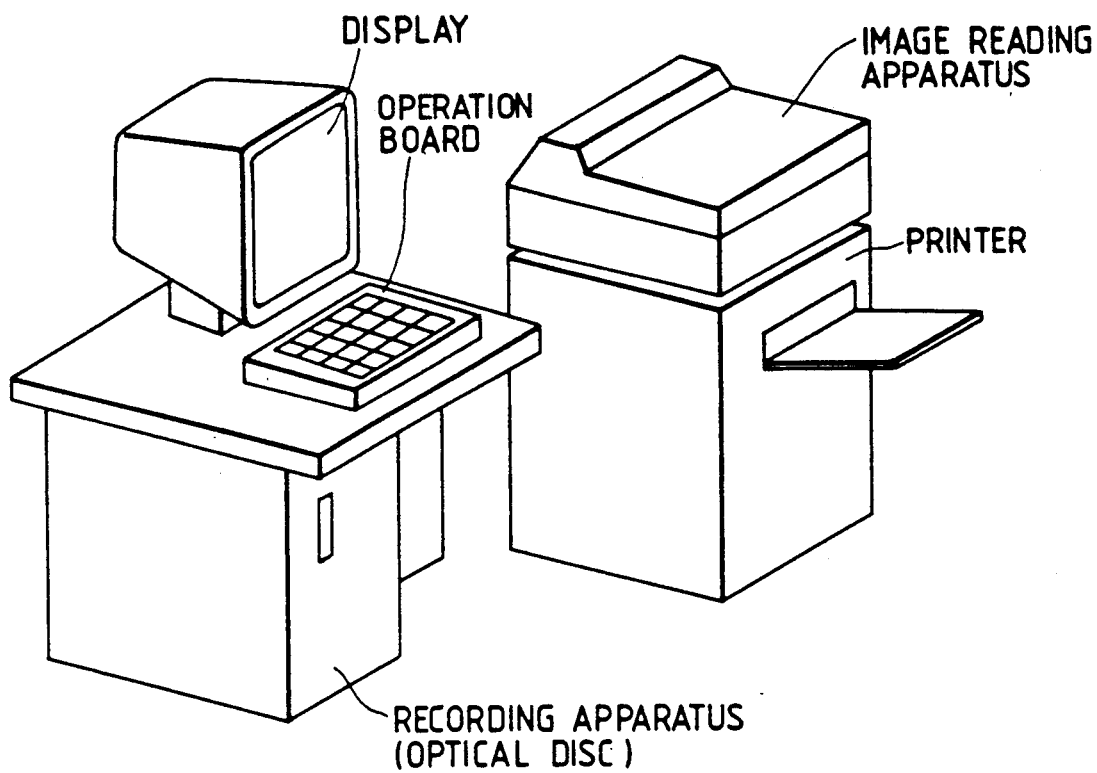
FIG. 11 is a perspective view of a conventional image processing apparatus.

FIG. 8 shows a condition wherein maintenance of the apparatus is performed when the original is jammed in the apparatus or when the reading area is cleaned or the like.

Then a release button 53 (see FIG. 1) provided at the top of the body of the image processing apparatus 1 is depressed, a hook (not shown) is released, whereby an upper unit (first body frame) H including the displayer 4, the optical system therefor, and rollers, belt, guide plates and the like which are positioned above the original feeding path is rotated around a support pivot 54a of a hinge 54 to be opened with a boundary of the original feeding path, as shown in FIG. 8. That is to say, the upper unit H is rotatably mounted on a lower unit (second body frame) L. When the upper unit H is rotated or opened, the guide plate 46 released from the pressure force due to the upper unit H can be rotated around the roller shaft 16a as shown. Accordingly, the original feeding path is completely exposed, thus facilitating the removal of the jammed original. Further, the transparent windows 48a, 49a, the contamination of which directly has influence upon the reading of the images on the original, and the feeding belts, feeding rollers, guide plates and the like can be easily cleaned.

Further, when the idle roller 38 is separated from the lower unit L by opening the upper unit H, the feeding belt 32 being pressed by the idle roller is loosened or slackened. Such slack of the belt is absorbed by the displacement of the tension roller 36. In this case, since the guide plate 54 provided between the idle roller 38 and the belt driving roller 35 is attached to the lower unit L, the feeding belt 32 is pressed or abutted against the guide plate 54, thus holding the original remaining in the original feeding path between the abutted belt 32 and the guide plate 54. Accordingly, when the upper unit H is opened for maintenance of the apparatus, the original can be prevented from being dropped out of the apparatus and or from overlapping with other originals, thus eliminating the problem wherein the sequence of the images on the originals becomes confused.

It is desirable that the opening angle of the upper unit H with respect to the lower unit L be regulated in such a manner that the ejector tray 10 is not so inclined with respect to the horizontal plane as to drop the originals out of this tray when the upper unit H is completely opened. Further, for safety, the outer or external power source is turned OFF when the upper unit H is opened; but, the display apparatus 4 continues to display the image data of the last-read original by an internal power source incorporated into the image processing apparatus. Accordingly, it can be quickly judged whether the originals remaining in the apparatus should be recorded again or not.

FIG. 9 is a perspective view showing an image processing apparatus according to another embodiment of the present invention. In the previously explained embodiment, while the original feeding path substantially extended in the up-and-down direction, in this other embodiment, the original feeding path is so designed that the original is introduced into an original inlet provided at the right front side of the apparatus and is fed behind a display apparatus and is ejected from an original outlet provided at left front side of the apparatus.

In FIG. 9, the reference numeral 60 designates such display apparatus, and 61 designates an original support by which the originals are supported, which original support has a supporting surface 61a for supporting lower edges of the originals. The reference numeral 62 designates a pressure plate for holding down the originals, which pressure plate can be moved on the supporting surface 61a in a direction perpendicular to the original support 61. The reference numeral 63 designates a feed unit incorporating a feed roller (not shown) therein. An ejector tray 66 has a supporting surface 66a for supporting lower edges of the originals and a pressure plate 66b for supporting and preventing the originals from falling down. The reference numeral 64 designates an insertion opening for inserting a disc as a recording medium into a recording apparatus (not shown) incorporated into the image processing apparatus.

By manipulating key switches 65, the original support 61 is moved toward the feed unit 63 to press the front surface of the outermost original against the feed roller incorporated into the feed unit 63. In this way, the originals are fed in the image processing apparatus, and the read original images are successively displayed on the display apparatus 60. Then, the originals are ejected to the ejector tray 66.

Further, the image processing apparatus can be opened along the lines DEFG with a boundary of the original feeding path for facilitating the jam correction operation and/or maintenance operation. The illustrated image processing apparatus is particularly advantageous for elongated originals, since the original can be introduced and ejected in the right and left direction with respect to the operator.

As mentioned above, according to the image processing apparatus in the illustrated embodiments the operator can feed the originals while looking at the display apparatus. That is to say, the operator can input the data while ascertaining whether the original image is correctly read by the image reading apparatus. Accordingly, as to an image such as a photographic image which needs delicate control and/or fine density, the operator can quickly judge whether any original image should be repeated again, and, thus, he can easily sort or distinguish erroneous originals from the correct originals on the spot. Therefore, the problem wherein the erroneous originals must be extracted later from a number of originals can be eliminated.

Further, since a memory having an large a capacity as is used in the conventional apparatus is not required, and since a memory having a capacity for storing at least the data corresponding to one original can be used, the whole apparatus can be inexpensive and small-sized. Accordingly, the whole apparatus including not only the reading apparatus and display apparatus but also the recording apparatus can be compact in a desk-top size.

As shown in FIG. 10A, by arranging the original feeding path to enclose the display apparatus in a U-shaped fashion, the curved portions in the original feeding path can be more gentle or moderate, in comparison with the curved portions in the original feeding paths as shown in FIGS. 10B and 10C, thus ensuring that the original is fed more correctly. Further, with such an arrangement of the original feeding path, since the original inlet is separated from the original outlet by a distance corresponding to the length of the display apparatus, the introduction and withdrawal of the original can be effected more easily.

Further, as mentioned above, since the apparatus can be separated or opened with a boundary of the original feeding path as shown in FIG. 8, jam correction and/or maintenance can be easily performed. In addition, by using a plate-shaped liquid crystal display as the display apparatus and by arranging the original feeding path and the reading optical paths substantially in parallel with the display, the whole apparatus can be small-sized, and the thickness l of the upper unit as shown in FIG. 8 can be thinned, thus facilitating the opening and closing operation of the upper unit H.

Furthermore, by decreasing the above-mentioned thickness l to move the original feeding path toward the display surface, a displayed image data can be easily coordinated with the associated original; and, by arranging the reading area for the original image at the upstream side of the original feeding path with respect to the display apparatus, since the display apparatus can display the image of the original being passed behind the display apparatus, when the upper unit H is opened, the flow of the original from the original inlet to the original outlet can be easily checked at a glance. Accordingly, the treatment of the erroneously read original can be easily effected. In addition, when the jamming of the original is corrected, by displaying the original image immediately before the jam occurs, it can be easily judged whether the originals remaining in the feeding path have already been read or not.

What is claimed is:

1. An image processing apparatus comprising:
    an original inlet for feeding in an original;
    an original outlet for discharging the original;
    feeding means for feeding the original from said original inlet to said original outlet through a predetermined feeding path, the feeding path including a path upwardly inclined between said original inlet and said original outlet;
    reading means, disposed along the feeding path, for reading an image from the original being fed to output an image signal corresponding to the read image;
    display means, disposed above said original inlet and having a display surface parallel to the upwardly inclined path, for displaying the read image thereon based on the image signal outputted from said reading means; and
    recording means adapted for recording the image signal outputted from said reading means onto a recording medium.

2. An image processing apparatus according to claim 1, wherein said original outlet is disposed above said display means, and wherein the display means is disposed in front of the feeding path.

3. An image processing apparatus according to claim 1, wherein said display means has a plate-shaped configuration, and wherein said reading means is arranged behind said display means.

4. An image processing apparatus according to claim 3, wherein said display means comprises a liquid crystal display.

5. An image processing apparatus according to claim 1, wherein said reading means comprises two reading devices arranged on both sides of said original feeding path, one of said reading devices reading the image on a first surface of the original, and the other reading device reading the image on a second surface of said original.

6. An image processing apparatus according to claim 1, wherein said reading means includes image sensor means, and optical means for focusing the image of the original onto said image sensor means.

7. An image processing apparatus according to claim 6, wherein said reading means further includes illuminating means for illuminating both surfaces of the original, and wherein said image sensor means is arranged on both sides of said original feeding path, and wherein said illuminating means illuminates a first predetermined portion of said first surface of the original and illuminates a second predetermined portion of said second surface of said original, said second predetermined portion being offset from said first predetermined portion in a longitudinal direction of said orignal feeding path.

8. An image processing apparatus according to claim 1, further including a body which can be separated into a first body frame and a second body frame.

9. An image processing apparatus according to claim 8, wherein said display means is arranged within said first body frame, and wherein said first body frame is rotatably mounted on said second body frame.

10. An image processing apparatus according to claim 9, wherein said recording means is arranged within said second body frame.

11. An image processing apparatus according to claim 10, wherein said reading means comprises first and second reading devices which are arranged within said first and second body frames, respectively, said first reading device reading the image on a first surface of the original, and said second reading device reading the image on a second surface of said original.

12. An image processing apparatus according to claim 1, wherein said recording means is arranged on an opposite side of said display means with respect to the original feeding path.

13. An image processing apparatus according to claim 12, wherein said display surface of said display means is upwardly inclined, and further comprising an operation switch arranged between an lower end of said display surface and said original inlet.

14. An image processing apparatus according to claim 13, further including an original support arranged adjacent said original inlet and on which the original is supported, and a feed means for feeding the original supported on said original support to said original feeding path.

15. An image processing apparatus according to claim 1, further including input means for inputting index information to said recording means.

16. An image processing apparatus according to claim 1, wherein said display means displays the image of the original being fed.

17. An image processing apparatus comprising:
a hold base for holding an original with an image surface thereof facing upward;
feeding means for feeding the original on said hold base through a predetermined feeding path;
reading means, disposed along the feeding path, for reading the image on the original to output an electric signal corresponding to the read image;
display means disposed above said hold base and along the feeding path, for displaying the image on the original based on the image signal, said display means and said hold base being arranged along the feeding path and forming an obtuse angle with respect to each other so that the image on the original and the image displayed on said display means are visible from the same position; and
memory means for storing the signal outputted from said reading means.

18. An image processing apparatus according to claim 17, wherein said hold base is disposed substantially horizontally.

19. An image processing apparatus according to claim 17, further comprising a receiving base disposed above said display means, for receiving originals through the feeding path formed behind said display means.

20. An image processing apparatus according to claim 19, wherein said receiving base is disposed on said display means, and wherein said display means is disposed in an upright configuration between said holding base and said receiving base.

21. An image processing apparatus according to clam 17, wherein said display means and said reading means are disposed on one side of the feeding path, while said memory means is disposed on another side of the feeding path.

22. An image processing apparatus according to claim 21, wherein said reading means is disposed on both sides of the feeding path to read images from both surfaces of the original.

23. An image processing apparatus according to claim 17, wherein the image on the original is displayed on said display means while the original is passing through the feeding path behind said display means.

24. An image processing apparatus comprising:
a sheet supply tray for holding plural originals with image surfaces thereof facing upward;
separating means for separating an uppermost original from the plural originals on said sheet supply tray;
feeding means for feeding the original separated by said separating means along a predetermined feeding path;
a sheet discharge tray for holding sheets which have been discharged from the feeding path;
discharge means for inverting the original fed by said feeding means to discharge it to said sheet discharge tray with the image surface thereof facing downward;
optical response means, disposed along the feeding path, for detecting the image on the fed original to output an electric image signal corresponding to the detected image;
a crystal display, disposed above said sheet supply tray, for displaying the detected image based on the image signal outputted from said optical response means;
said sheet supply tray, said crystal display, and said sheet discharge tray being arranged in that order in the direction of the sheet feeding path, said sheet discharge tray being disposed above said crystal display; and
memory means for storing the image signal outputted from said optical response means.

25. An image processing apparatus according to claim 24, further including first and second main bodies which are disposed on opposite sides of the feeding path and can be separated from each other, said crystal display and said optical response means being mounted on said first main body, said sheet supply tray and said memory means being mounted on said second main body.

26. An image processing apparatus according to claim 25, wherein said first main body is rotatably supported relative to said second main body.

27. An image processing apparatus according to claim 25, further comprising second optical response means mounted on said second main body for detecting an image on a back surface of the original.

28. An image processing apparatus according to claim 24, wherein said crystal display is arranged with a display surface thereof being oriented substantially vertically, and wherein the feeding path is formed behind the display means substantially parallel to the display surface.

29. An image and recording system comprising:
a first holding base for holding an original to be recorded;
a second holding base for holding an original fed from said first holding base;

feeding means for feeding the original held on said first holding base to said second holding base through a predetermined feed path;

an image sensor for detecting an image on the original being fed to output an electric image signal;

display means disposed at a location adjacent said first holding base;

recording means adapted for recording the image signal outputted from said image sensor onto a detachable recording medium; and display control means for receiving (a) the image signal outputted from said image sensor and (b) the image signal recorded on the recording medium, and for selectively displaying images corresponding to the received image signals on said display means.

30. An image processing apparatus according to claim 29, wherein the recording medium comprises an optical disc.

31. An image reading apparatus comprising:

a holding base;

feeding-out means for feeding out an original held on said holding base;

a first press means for resiliently pressing an uppermost original among the originals held on said holding base against said feeding-out means;

a second press means for holding said holding base at a predetermined position to press it onto said feeding-out means;

selection means for selectively operating said first press means or said second press means;

feeding means for feeding the original fed out by said feeding-out means to a reading position through a predetermined feeding path;

reading means for reading an image from an original fed to the reading position to output an electric image signal; and display means for displaying the read image in response to the image signal outputted from said reading means.

* * * * *

UNITED STATES PATENT AND TRADEMARK OFFICE
CERTIFICATE OF CORRECTION

PATENT NO. : 5,038,222

DATED : August 6, 1991

INVENTOR(S) : Yoshihiro Saito

It is certified that error appears in the above-identified patent and that said Letters Patent is hereby corrected as shown below:

COLUMN 1:

Line 15, "the is" should read --this--.

COLUMN 3:

Line 25, "fed roller 15" should read --feed roller 15--.

COLUMN 9:

Line 58, "Then" should read --When--.

COLUMN 12:

Line 62, "orignal" should read --original--.

UNITED STATES PATENT AND TRADEMARK OFFICE
CERTIFICATE OF CORRECTION

PATENT NO. : 5,038,222

DATED : August 6, 1991

INVENTOR(S) : Yoshihiro Saito

It is certified that error appears in the above-identified patent and that said Letters Patent is hereby corrected as shown below:

<u>COLUMN 13</u>:

Line 20, "an" should read --a--.

Line 66, "clam" should read --claim--.

Signed and Sealed this

Thirtieth Day of March, 1993

*Attest:*

STEPHEN G. KUNIN

*Attesting Officer*     Acting Commissioner of Patents and Trademarks